UNITED STATES PATENT OFFICE.

AMOS D. LUFKIN, OF CLEVELAND, OHIO.

IMPROVEMENT IN PREPARING HIDES FOR TANNING.

Specification forming part of Letters Patent No. 29,392, dated July 31, 1860; Reissue No. 1,450, dated April 7, 1863.

*To all whom it may concern:*

Be it known that I, AMOS D. LUFKIN, of Cleveland, Cuyahoga county, State of Ohio, have invented certain new and useful Improvements in Depilating and Preparing Hides and Skins for Tanning; and I do affirm the following to be the description of the materials employed and the mode of compounding and using them.

The nature of my invention consists in substituting for liming, sweating, and "bating" a certain process by the proper use of which hides and skins may be depilated and fitted for tanning, so as to preserve all their good qualities in an unimpaired and natural condition, thereby producing heavier as well as finer, tougher, and softer leather.

First. The materials used in this process are substantially as follows: Sulphur, (S,) one part; soda-ash, (NaO,) or its equivalent, one part, and quicklime, (CaO,) ten parts, by weight.

Second. These materials are thus used: Put the soda-ash, in fine powder, into a suitable box with the sulphur, adding water enough to make them plastic. Then, with a common hoe, mix and grind them thoroughly together. To the lime, fully slaked and hot from slaking, add this soda-ash and sulphur prepared as above, and mix the whole mass together till it becomes perfectly uniform in quality and color, using water enough to allow the whole to be easily worked; or the soda-ash may be dissolved with water or steam, and the sulphur added thereto. Then proceed as above directed.

Third. The depilating-liquid is prepared by dissolving fully this compound, made as above, in water. Two pounds of sulphur, two of soda-ash, and twenty of lime, dissolved in the proper quantity of water, will be enough for one hundred calf-skins. For hides the liquid should be made stronger in due proportion. This liquid can at any time be strengthened by adding more of the compound when a more prompt action is demanded, and the same liquid can also be "strengthened up" as the case requires for successive packs until a less favorable action is discovered, when the vat should be cleaned out and a new liquid substituted for the old one.

Were the elements of this compound as they are obtained for use accurately represented by their chemical symbols, it would be easy to fix definitely the proportions giving for each kind of stock the best results, and so state them; but this is not the fact. Therefore the proportions herein given should not be considered absolute, but may be varied according to the strength and purity of the ingredients used.

The sulphur of commerce is nearly uniform in quality and quite free from impurities; but the quality and alkaline strength of soda-ash vary much, and as the object of this element is to dissolve the sulphur or bring it into a condition that will more readily combine with the lime, so as to change the nature and mode of its action upon the skin, the smallest amount of this or any other form of alkali that will accomplish this object is found in practice to be or work the best. I have employed sulphur and lime direct in different proportions; but the action was not as efficient, and the results, so far as developed, were not satisfactory.

Skins and hides, having been fully prepared, should be treated in the unhairing-liquid from two to six days. The longer time seems to prepare the gelatine better for the tannin. If soft and pliable stock is to be produced, the lime, if best quality, may be slightly reduced below the proportion herein given; if heavy stock—as sole-leather, where firmness and solidity are the essential qualities—the lime element may be somewhat increased. When the hair has been removed from the skins or hides, they can be made ready for the tan-vat by simply soaking them in soft water between each working upon the beam. Water slightly warm facilitates the operation. When convenient, "milling" them for a short time with a thorough washing in clean water has been found sufficient. If the water for this use is hard, a little bate may be advantageous.

This compound, as an agent for the preparation of hides and skins for the bark, will become completely under the control of the operator. Rightly made, experience has shown that even under protracted treatment it does not injure or diminish the gelatine of the skin; but while acquiring a knowledge of the nature and qualities of the compound the care and skill of the operator should be in constant use to detect and correct any apparently wrong action incident to this as to every new process.

I am aware that compositions for purposes similar to mine have been proposed by charging alkalies and lime with sulphureted hydrogen, and also by fusing sulphur with alkalies and alkaline earths. These processes are objectionable, both on account of the difficult operations required in carrying them into practice, and also on account of want of uniform results in their use, whereas mine, on the contrary, is exceedingly simple and certain in its operations.

What I claim as my invention, and desire to secure by Letters Patent, is—

The process of treating hides by the use of sulphur for the purpose of removing the hair and preparing them to be tanned, substantially as herein described.

A. D. LUFKIN.

Witnesses:
EDM. F. BROWN,
MOSES KELLY.